United States Patent [19]

Nguyen et al.

[11] Patent Number: 4,528,154

[45] Date of Patent: Jul. 9, 1985

[54] PREPARATION OF MOLDED LIGNOCELLULOSIC COMPOSITIONS USING AN EMULSIFIABLE POLYISOCYANATE BINDER AND AN EMULSIFIABLE CARBOXY FUNCTIONAL SILOXANE INTERNAL RELEASE AGENT

[75] Inventors: Tinh Nguyen, Germantown, Md.; James M. Gaul, Exton, Pa.

[73] Assignee: Atlantic Richfield Company, Los Angeles, Calif.

[21] Appl. No.: 504,698

[22] Filed: Jun. 15, 1983

[51] Int. Cl.³ .............................................. B29J 5/00
[52] U.S. Cl. .................................... 264/109; 264/125; 264/130; 264/134; 264/136; 556/453; 556/456
[58] Field of Search ............... 264/109, 122, 125, 130, 264/134, 136, 300; 556/453, 456

[56] References Cited

U.S. PATENT DOCUMENTS

| | | | |
|---|---|---|---|
| 3,382,150 | 5/1968 | Grass et al. | 264/300 |
| 3,428,592 | 2/1969 | Youker | 260/29.2 |
| 3,440,189 | 4/1969 | Sharp | 260/9 |
| 3,557,263 | 1/1971 | Marra | 264/45 |
| 3,636,199 | 1/1972 | Jenks et al. | 264/134 |
| 3,663,666 | 5/1972 | Vincent | 264/122 |
| 3,803,284 | 4/1974 | Burghardt | 264/130 |
| 3,870,665 | 3/1975 | Diehr et al. | 260/17.2 |
| 3,919,017 | 11/1975 | Shoemaker et al. | 156/62.2 |
| 3,919,279 | 11/1975 | Rosenthal et al. | 260/453 P |
| 3,930,110 | 12/1975 | Shoemaker et al. | 428/424 |
| 3,962,302 | 6/1976 | Rosenthal et al. | 260/453 P |
| 3,996,154 | 12/1976 | Johnson et al. | 252/312 |
| 4,024,090 | 5/1977 | von Bonin et al. | 264/300 |
| 4,033,912 | 7/1977 | Kleimann et al. | 264/300 |
| 4,066,594 | 1/1978 | Moeller | 556/453 |
| 4,076,695 | 2/1978 | Keil | 264/300 |
| 4,100,328 | 7/1978 | Gallagher | 264/122 |
| 4,110,397 | 8/1978 | Wooler | 264/109 |
| 4,111,861 | 9/1978 | Godlewski | 264/300 |
| 4,143,014 | 3/1979 | McLaughlin et al. | 260/29.2 |
| 4,197,219 | 4/1980 | Damico | 260/7 |
| 4,220,727 | 9/1980 | Godlewski | 264/300 |
| 4,257,995 | 3/1981 | McLaughlin et al. | 264/109 |
| 4,257,996 | 3/1981 | Farrissey, Jr. et al. | 264/122 |
| 4,258,169 | 3/1981 | Prather et al. | 264/122 |
| 4,374,791 | 2/1983 | Farrissey et al. | 264/109 |
| 4,376,088 | 3/1983 | Prather | 264/109 |
| 4,376,089 | 3/1983 | Bogner et al. | 264/109 |
| 4,379,100 | 4/1980 | Salisbury et al. | 264/300 |
| 4,414,361 | 11/1983 | Gaul et al. | 264/122 |
| 4,428,897 | 1/1984 | Lowenkron et al. | 264/109 |

FOREIGN PATENT DOCUMENTS 2703271 11/1979 Fed. Rep. of Germany.
2031914 4/1980 United Kingdom.

*Primary Examiner*—Jeffery Thurlow
*Assistant Examiner*—Patrick Dailey
*Attorney, Agent, or Firm*—Delbert E. McCaslin

[57] ABSTRACT

A binder system is provided for the preparation of lignocellulosic composite molded articles, such as flake or particle board, which incorporates an internal release agent and comprises an emulsifiable organic di- or polyisocyanate and an emulsifiable carboxy functional siloxane. The emulsifiable carboxy functional siloxane is preblended with the di- or polyisocyanate providing for increased mold release properties.

9 Claims, No Drawings

PREPARATION OF MOLDED LIGNOCELLULOSIC COMPOSITIONS USING AN EMULSIFIABLE POLYISOCYANATE BINDER AND AN EMULSIFIABLE CARBOXY FUNCTIONAL SILOXANE INTERNAL RELEASE AGENT

BACKGROUND OF THE INVENTION

The present invention relates to organic polyisocyanate binder compositions for the preparation of lignocellulosic molded articles and more particularly to a method for preparation of particle board with a polyisocyanate binder system having an internal release agent.

The molding of lignocellulosic and lignocellulosic-containing fibers, particles or layers to form composite articles is known. Organic di- and polyisocyanates as useful binders for lignocellulose materials have been known for some time and give to particle board products increased stability and mechanical strength; see, for example, U.S. Pat. Nos. 3,428,592; 3,440,189; 3,557,263; 3,636,199; 3,870,665; 3,919,017 and 3,930,110. It is also known in the art that the isocyanate binders are mixed with the wood particles utilized as the base for the particle board. A wood chip or particle and isocyanate binder mixture is then formed into a mat and molded with pressure and temperature to the desired size or shape. However, due to the non-aqueous nature of straight isocyanate binder systems, as well as bonding efficiency and high cost, attempts have been made to develop water emulsion polyisocyanate binder systems. The water emulsion binders allow easier cleaning of equipment and application of larger binder volumes to increase the distribution efficiency of the binder without increasing cost. Such aqueous emulsion polyisocyanates and their preparation have been described for example in U.S. Pat. Nos. 3,996,154 and 4,143,014 as well as German Offen. No. 2,724,363. A principal disadvantage of the use of the isocyanates in the preparation of particle board is due to its excellent adhesive properties. Thus, water emulsion isocyanate systems, like the straight polyisocyanate binders, stick tenaciously to the metal caul plates which are employed to support the wood particles during transporting and the pressing or molding processes. Such poor release of the molded particle board from the caul or mold surface creates difficulty in the cleaning and automatic handling of the cauls. In order to prevent the sticking problem, external release agents have been applied to the caul plates or platens or mat surface as described for example in U.S. Pat. No. 4,110,397. The external type of release agent is not only inconvenient to use because it generally must be applied for every pressing cycle, but is also not very reliable in large scale production. Another method to overcome the sticking problem has been to overlay the isocyanate bound lignocellulosic particles with a veneer of wood as shown, for example, in U.S. Pat. Nos. 3,390,110; 4,197,219 and 3,919,017, or with the use of a release paper. These methods have the disadvantage of either adding more cost to the product or of not fully utilizing the superiority of the isocyanate binder. In an attempt to minimize these disadvantages, internal release agents have been developed for incorporation into the binder or to be sprayed separately onto the wood particles or chips as described, for example in U.S. Pat. Nos. 3,870,665; 4,257,995; 4,376,088 and 4,376,089 and British Pat. No. 2,031,914.

The present invention which comprises an aqueous emulsion isocyanate binder system with a water-emulsifiable internal release agent consisting of a carboxy functional siloxane for the preparation of compression molded lignocellulosic compositions avoids the above-mentioned disadvantages.

SUMMARY OF THE INVENTION

This invention relates to the preparation of lignocellulosic composite articles such as particle board which comprises contacting the lignocellulosic particles with a mixture of an an aqueous emulsion polyisocyanate and an aqueous emulsion carboxy functional siloxane to impart internal release properties to the lignocellulosic composite article when molding the lignocellulosic-polyisocyanate-siloxane mixture under heat and pressure to form said article.

It is an object of the present invention to provide an improved binder with an internal release agent for use with particle boards and the like.

It is another object of this invention to provide a water emulsifiable internal release agent for use with water emulsifiable polyisocyanates in the compression molding of lignocellulosic materials.

A further object of the invention is an improved binder comprising a blend of an aqueous polyisocyanate emulsion and an aqueous carboxy functional siloxane emulsion.

These and other objects and advantages of this invention will become apparent from the description of the invention and from the claims.

DETAILED DESCRIPTION OF THE INVENTION

The binder system of the present invention for the preparation of lignocellulosic composite molded articles, particularly particle board, by bonding together the wood chips or other lignocellulosic or organic material using heat and pressure, comprises a water emulsifiable polyisocyanate and a water emulsifiable carboxy functional siloxane as an internal release agent. The water emulsifiable carboxy functional siloxanes are preblended with the water emulsifiable polyisocyanate binders. The preblending may be carried out by either mixing the emulsifiable siloxane internal release agent with the emulsifiable polyisocyanate binder and then emulsifying with water or by mixing after both components have already been emulsified with water. Preblending may also be carried out by mixing the emulsifiable carboxy functional siloxane with the water-emulsion polyisocyanate binder or mixing the aqueous emulsion of carboxy functional siloxane with the emulsifiable polyisocyanate binder and then emulsifying with water. The formation of the polyisocyanate emulsion or dispersion can be carried out at any time prior to its use as the binder composition, but, preferably is done within about 3 hours prior to use.

The concentration of emulsifiable carboxy functional siloxane employed in the present invention is between about 0.4 and 6.0 percent by weight based on the emulsifiable polyisocyanate employed. The aqueous emulsified carboxy functional siloxane may have a concentration of between about 0.1 to 90 percent by weight in water. The aqueous emulsified polyisocyanate binder may have a concentration of between about 10 and 75 percent by weight emulsifiable polyisocyanate in water.

The polyisocyanate component which may be used in the emulsions of the present invention for the binder system can be any organic polyisocyanate and include aliphatic, alicyclic and aromatic polyisocyanates that contain at least two isocyanate groups per molecule. Such polyisocyanates include the diisocyanates and higher functionality isocyanates. Mixtures of polyisocyanates may be used which for example are the mixtures of di- and higher functional polyisocyanates produced by phosgenation of aniline-formaldehyde condensate or as described in U.S. Pat. Nos. 3,962,302 and 3,919,279. The organic polyisocyanates may be isocyanate-ended prepolymers made by reacting under standard known conditions, an excess of a polyisocyanate with a polyol which on a polyisocyanate to polyol basis may range from about 20:1 to 2:1 and include for example polyethylene glycol, polypropylene glycol, triethylene glycol, etc. as well as glycols or polyglycols partially esterified with carboxylic acids including polyester polyols and polyether polyols. Illustrative of organic polyisocyanates which may be employed include for example, toluene-2,4- and 2,6-diisocyanates or mixtures thereof, diphenylmethane diisocyanate, m- and p-phenylene diisocyanates or mixtures thereof, diphenylmethane diisocyanate, m- and p-diphenylene diisocyanates, polymethylene polyphenyl isocyanates, naphthalene-1,5-diisocyanate, chlorophenylene diisocyanate, α,α-xylene diisocyanate, triphenylmethane triisocyanate, hexamethylene diisocyanate, 3,3'-ditolylene-4,4-diisocyanate, butylene 1,4-diisocyanate, octylene-1,8-diisocyanate, 1,4-, 1,3- and 1,2-cyclohexylene diisocyanate and in general the polyisocyanates disclosed in U.S. Pat. Nos. 3,577,358, 3,012,008 and 3,097,191. The preferred polyisocyanates are the diphenylmethane diisocyanate 2,4' and 4,4' isomers including the 2,2' isomer and the higher functional polyisocyanate and polymethylene polyphenyl isocyanate mixtures, which may contain from about 20 to 85 weight percent of the diphenylmethane diisocyanate isomers. Typical of the preferred polyisocyanates are those sold commercially as "Rubinate-M" (Rubicon Chemicals, Inc.). In general the organic polyisocyanates will have a molecular weight in the range between about 100 and 10,000. The aqueous organic polyisocyanate or isocyanate-terminated prepolymer emulsions are generally prepared by using any of the techniques known in the art for the preparation of aqueous emulsions or dispersions prior to use of the composition as binder. In general the polyisocyanate is dispersed in water in the presence of an emulsifying or surface active agent which may be any of the emulsifying agents also known in the art including anionic and nonionic agents. Preparation of the aqueous emulsions may be carried out as described in U.S. Pat. Nos. 3,996,154; 4,143,014 and 4,257,995 incorporated herein by reference.

The water emulsifiable release agent used in this invention contains carboxy functional siloxanes and nonionic emulsifiers or surface active agents. The carboxy functional siloxanes useful in the instant invention consist essentially of from 0.5 to 20 mole percent of $R_aR'_bSiO_{4-a-b/2}$ units and from 80 to 99.5 mole percent of $R''_cSiO_{4-c/2}$ units wherein R is a carboxyl functional radical, a has an average value from 1 to 3, R' is a hydrocarbon or substituted hydrocarbon radical, b has an average value from 0 to 2, the sum of a+b is from 1 to 3, R" is a hydrocarbon or substituted hydrocarbon radical and c has an average value from 0 to 3.

In the above defined carboxyl functional siloxanes the R radical can be any radical containing one or more —COOH groups and is attached to the silicon atom.

While the particular means of attachment of the R radical to the silicon atom is not believed to be critical, for example attachment may be by means of Si—C or Si—O—C bonds, it is preferred that bonding be via a silicon-carbon bond. Particularly preferred R radicals are those of the formula HOOC—R'''— wherein R''' is a divalent linking group composed of carbon, hydrogen and oxygen atoms; or carbon hydrogen and sulfur atoms. Specific examples or R''' include the methylene, ethylene, propylene, hexamethylene, decamethylene, —CH₂CH(CH₃)CH₂—, phenylene, naphthylene, —CH₂CH₂SCH₂CH₂—, —CH₂CH₂OCH₂—,

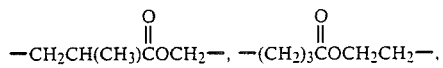

—C₆H₄C₆H₄—, —C₆H₄CH₂C₆H₄—, and the

radical. It is preferred that the R''' linking group contain from 2 to 10 carbon atoms. There can be an average of from 1 to 3 carboxy functional R radicals attached to the silicon atom, i.e., a in the above formula has an average value of from 1 to 3. While the carboxy functional siloxane units can constitute from 0.5 to 20 mole percent of all the siloxane units, it is generally preferable that such units are present in the range from 0.5 to 10 mole percent.

As indicated above, R' radical can be any hydrocarbon or substituted hydrocarbon radical. Illustrative of the R' radicals that can be present are alkyl radicals such as the methyl, ethyl, propyl, butyl, amyl, hexyl, octyl, decyl, dodecyl, octadecyl, and myricyl radicals; alkenyl radicals such as the vinyl, allyl, and hexenyl radicals; cycloalkyl radicals such as the cyclobutyl and cyclohexyl radicals; aryl radicals such as the phenyl, xenyl, and naphthyl radicals; aralkyl radicals such as the benzyl and 2-phenylethyl radicals; alkaryl radicals such as the tolyl, xylyl and mesityl radicals; the corresponding halohydrocarbon radicals such as 3-chloropropyl, 4-bromobutyl, 3,3,3-trifluoropropyl, chlorocyclohexyl, bromophenyl, chlorophenyl, alpha,alpha,alphatrifluorotolyl and the dichloroxenyl radicals; the corresponding cyanohydrocarbon radicals such as 2-cyanoethyl, 3-cyanopropyl and cyanophenyl radicals; the corresponding mercaptohydrocarbon radicals such as mercaptoethyl, mercaptopropyl, mercaptohexyl and mercaptophenyl; ether and ester hydrocarbon radicals such as —(CH₂)₃OC₂H₅, —(CH₂)₃OCH₃, —(CH₂)₃COOC₂H₅ and and (CH₂)₃COOCH₃; the corresponding thioether and thioester hydrocarbon radicals such as —(CH₂)₃SC₂H₅ and —(CH₂)₃COSCH₃; and nitrohydrocarbon radicals such as the nitrophenyl and 3-nitropropyl radicals. It is preferred that the R' radical be a hydrocarbon radical containing from 1 to 18 carbon atoms. In the most preferred embodiment of this invention at least 90 percent of all the R' radicals are methyl radicals. There can be an average of from 0 to 2 R' radicals attached to the silicon atom, i.e., b has an average of from 0 to 2 in the above formula.

The R' radical in the carboxy functional siloxanes of this invention can also be any hydrocarbon or substituted hydrocarbon radical. The illustrative examples given with respect to R' above are equally applicable here and are not repeated for the sake of brevity. Likewise, the preferences set forth for R' above also apply to the R' radical. There can be from 0 to 3 R' radicals, on the average, per silicon atom, i.e., c has an average value of from 0 to 3 in the above formula. The nonionic emulsifiers for preparation of the emulsifiable carboxy functional siloxanes are those void of amine and amide groups and have a hydrophobic-lipophobic balance between 13.0 and 14.0 and preferably 13.2 and 13.8 depending on molecular weights and compositions of the carboxy functional siloxane. Typical of the nonionic emulsifiers are the octyl phenoxy polyethoxylated ethanols of the general formula

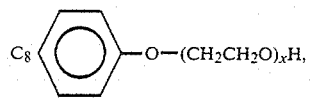

sold commercially as "Triton X-45", "Triton X-100", "Triton X-102" and "Triton X-114" (Rohm & Haas Co.) wherein x in the above formula=5, 9-10, 12-13 and 7-8 respectively; "Igepal CO-850" also an alkylphenoxy poly(oxyethylene)ethanol of the general formula

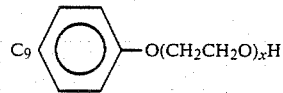

with x being 8-9 and sold by (G.A.F. Corporation) and "Tergitol TMN6" a trimethyl nonyl polyethylene glycol of the general formula

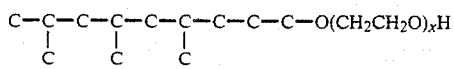

with x being 6 and sold by Union Carbide Corporation.

The lignocellulose employed to prepare the molded compositions using the binder system including the release agent, according to the present invention include wood chips, wood fibers, shavings, sawdust, wood wool, cork bark and the like products from the woodworking industry. Fibers, particles, etc. from other natural products which are lignocellulosic such as straw, flax residues, dried weeds and grasses, nut shells, hulls, from cereal crops such as rice and oats and the like may be used. In addition, the lignocellulosic materials may be mixed with inorganic flakes or fibrous material such as glass fibers or wool, mica and asbestos as well as with rubber and plastic materials in particulate form. The lignocellulose may contain a moisture (water) content of up to 25 percent by weight but preferably contains between 4 and 12 percent by weight moisture.

In manufacturing lignocellulosic composite products for the purpose of this invention, such as flakeboard for example, a small amount of the emulsified polyisocyanate into which emulsified carboxy functional siloxane has been blended, along with the wood flakes is simply milled or mixed uniformly together. Generally the polyisocyanate-siloxane emulsion mixture is sprayed onto the material while it is being mixed or agitated in suitable and conventional equipment. After forming a uniform mixture the coated wood particles are formed into a loose mat or felt in the desired proportions onto a caul plate of aluminum or steel which serves to carry the "cake" into the heated press to consolidate the wood particles into a board of desired thickness. Temperatures of the press are generally between about 140° and 220° C. and pressures from about 100 to 600 psi. Pressing times are from about 1 to 10 preferably 3 to 5 minutes. Pressing times, temperatures and pressures may vary widely, depending on the thickness of the board produced, the desired density of the board, and size of lignocellulosic particles used including other materials.

The polyisocyanate-carboxy functional siloxane emulsion binder use levels according to the present invention, based on the weight of oven dried (0% moisture content) lignocellulosic material is from about 1.5 to 12 preferably 2.5 to 6.5 weight percent.

The following examples are provided to illustrate the invention in accordance with the principles of this invention, including examples of a comparative nature, but are not to be construed as limiting the invention in any way except as indicated by the appended claims.

EXAMPLE 1

Preparation of Water Emulsifiable Polyisocyanate

A water emulsifiable polyisocyanate binder was prepared by mixing together 100 parts by weight of a diphenylmethane diisocyanate-polymethylene polyphenyl isocyanate (PMDI) mixture having a 46.5 percent diphenylmethane diisocyanate content, 30 parts by weight of a liquid polyoxypropylene derivative of trimethylolpropane ("TP-1540" sold commercially by BASF Corp.) having an average molecular weight of 1560, hydroxyl number KOH/g. of 108, acid No. of 0.06, a viscosity at 25° C. of 340 cps. and a specific gravity 25/25° C. of 1.01, and 10 parts by weight methoxy polyethylene glycol ("Carbowax 750" of Union Carbide Corp.). The mixture was heated at 60° C. for 4 hours with stirring and then cooled to room temperature and ready for use. A 50 percent water emulsion of this emulsifiable polyisocyanate was stable for up to 3 hours.

EXAMPLE 2

Preparation of Water Emulsifiable Carboxy Siloxane

Three water emulsifiable carboxy functional siloxanes were prepared by mixing together 100 parts of a carboxyl functional siloxane, composed of about 2 mole percent $HOOCCH_2SCH_2CH_2(CH_3)SiO$ units, about 96 mole percent $(CH_3)_2SiO$ units and about 2 mole percent $(CH_3)_3SiO_{\frac{1}{2}}$ units and having an equivalent weight of about 4200, a specific gravity of 0.98 and a viscosity of about 250 cps at 25° C., with 10 parts by weight of 1, 2 or 3 as follows:

1. A mixture of 94 parts by weight of octylphenoxy polyethylated ethanol ("Triton X-100") and 6 parts by weight octylphenoxy polyethoxylated ethanol ("Triton X-114").

2. Heating at 50° C. while stirring a mixture of 73 parts by weight of octylphenoxy polyethoxylated ethanol ("Triton X-102") and 27 parts by weight octylphenoxy polyethoxylated ethanol ("Triton X-45").

3. Heating at 60° C. while stirring a mixture of 40 parts by weight of nonylphenoxy polyethoxylated ethanol ("Igepal CO-850") and 60 parts by weight of trimethyl nonyl polyethylene glycol ("Tergitol TMN6").

EXAMPLE 3-Control 580 g. of pine wood chips dried to a moisture content of 6 percent were placed in an open tumbler-mixer. During tumbling 49 g. (4.5% based on oven dry wood) of a 50% water emulsion of the polyisocyanate of Example 1 was sprayed evenly onto the wood chips by an air pressurized system. The polyisocyanate water-emulsion coated wood chips were then formed in a box 10.5 inches square and 12 inches high which was supported by a new untreated aluminum caul plate 12 inches square, and prepressed to form a thick mat. The box was then taken out and a second 12 inch untreated aluminum caul plate laid on top of the mat. The whole assembly was then pressed to stops at a thickness of 13 mm at 190° C. and held for 4 minutes. After release from the press, the board or pressed cake could not be separated from the caul plates.

EXAMPLE 4-Control

The procedure of Example 3 was repeated except that the caul plates were treated with a zinc stearate external release agent. After pressing at the same temperature and for the same time period, the board or pressed cake released readily. The board obtained had a density of 0.675 g/cm$^3$, an internal bonding (IB) strength of 193 psi, a modulus of rupture (MOR) of 2414 psi and a thickness swelling (SW) of 24.2 percent after 24 hours submerged in water at 25° C.

EXAMPLE 5-Comparative

The procedure of Example 3 was repeated except that 1.2 g. (4.9 percent based on the polyisocyanate emulsion) of the carboxy functional siloxane of Example 2, which was not emulsified, was added to the binder emulsion. The polyisocyanate water emulsion-siloxane were not compatible and the mixture phase separated. After 4 minutes of pressing with untreated caul plates at 190° C., the board adhered strongly to the cauls and did not separate even after cooling to room temperature.

EXAMPLE 6

The procedure of Example 5 was repeated except that 0.74 g. (3.02 percent based on the polyisocyanate emulsion binder) of the emulsified carboxy functional siloxane as prepared in Example 2 (1) as employed. The polyisocyanate and siloxane were compatible and provided a homogeneous mixture. A board or pressed cake was prepared as in Example 3 using the mixture and after 4 minutes of pressing, the board was readily separated from the caul plates. The composite board obtained had a density of 0.670 g/cm$^3$, IB of 180 psi, MOR of 2510 psi and an SW of 21 percent after 24 hours submerged in water at 25° C.

EXAMPLE 7

The procedure of Example 6 was repeated using 1.47 g. of a 50 percent water emulsion (3 percent of release agent based on polyisocyanate binder) of emulsified carboxy functional siloxane as prepared in Example 2(3). After 4 minutes of pressing at the same temperature the board was readily released from the caul plates. The composite board product obtained had a density of 0.67 g/cm$^3$, an IB of 185 psi, an MOR of 2530 psi and an SW of 20 percent after 24 hours submerged in water at 25° C.

EXAMPLE 8

The procedure of Example 6 was repeated using 0.37 g. (1.5 percent based on the polyisocyanate emulsion binder) of emulsified carboxy functional siloxane as prepared in Example 2(2). After 4 minutes of pressing at the same temperature of 190° C. the board was readily released from the caul plates. The composite board product had a density of 0.674 g/cm$^3$, an IB of 190 psi, an MOR of 2540 psi and an SW of 22 percent after 24 hours submerged in water at 25° C.

We claim:

1. In a process for the preparation of lignocellulosic composite molded articles wherein lignocellulosic particles are contacted with a polyisocyanate composition and the treated particles are subsequently formed into molded articles by the application of heat and pressure, the improvement which comprises imparting self-releasing properties to said lignocellulosic molded articles by contacting said lignocellulosic particles with from about 1.5 to 12 weight percent, based on oven dried lignocellulosic particles of a preblended mixture of an aqueous emulsified organic polyisocyanate, having a concentration of polyisocyanate of from about 10 to 75 percent by weight in water, with an aqueous emulsified carboxy functional siloxane having a concentration of carboxy functional siloxane of from about 0.1 to 90 percent by weight in water said preblended mixture having a concentration of emulsifiable carboxy functional siloxane of between about 0.4 and 6.0 percent by weight based on the emulsifiable polyisocyanate employed.

2. A process according to claim 1 wherein the polyisocyanate is a polymethylene polyphenyl polyisocyanate containing from about 20 to 85 percent by weight diphenylmethane diisocyanate.

3. A process according to claim 1 wherein the polyisocyanate is diphenylmethane diisocyanate.

4. A process according to claim 1 wherein the lignocellulosic particles are contacted with from 2.5 to 6.5 weight percent based on oven dried lignocellulosic particles of the preblended mixture.

5. A process according to claim 1 wherein the emulsified carboxy functional siloxanes are prepared with a nonionic emulsifier void of amines and amide groups and have a hydrophobic-lipophobic balance between 13.0 and 14.0.

6. A process according to claim 5 wherein the nonionic emulsifer is an alkylphenoxy poly(oxyethylene)ethanol.

7. A process according to claim 6 wherein the alkylphenoxy poly(oxyethylene)ethanol is an octylphenoxy polyethoxylated ethanol.

8. A process according to claim 1 wherein the lignocellulosic particles are molded at a temperature of between about 140° C. and 220° C. and a pressure of between about 100 and 600 psi for from 1 to 10 minutes.

9. In a process for the preparation of particle board wherein wood particles are contacted with a polyisocyanate composition and the treated particles are subsequently formed into boards by the application of heat and pressure, the improvement which comprises imparting internal release properties to said particle board by contacting said wood particles with from 2.5 to 6.5 weight percent, based on oven dried wood particles, of a preblended mixture of a water emulsified polymethylene polyphenyl polyisocyanate, containing from about 20 to 85 percent by weight diphenylmethane diisocyanate, and having a concentration of polyisocyanate of from about 10 to 75 percent by weight in water with a carboxy functional siloxane which has been emulsified with a surface active agent selected from the group consisting of octylphenoxy polyethoxylated ethanols, nonylphenoxy polyethoxylated ethanols and trimethyl nonyl polyethylene glycols, said emulsified carboxy functional siloxane having a concentration of carboxy functional siloxane of from about 0.1 to 90 percent by weight in water said preblended mixture having a concentration of emulsifiable carboxy functional siloxane of between about 0.4 and 6.0 percent by weight based on the emulsifiable polymethylene polyphenyl polyisocyanate.

* * * * *